United States Patent [19]
Wiesemann

[11] Patent Number: 5,272,282
[45] Date of Patent: Dec. 21, 1993

[54] ELECTRICAL-WIRING DUCT

[75] Inventor: Alfred Wiesemann, Horn, Fed. Rep. of Germany

[73] Assignee: DORMA GmbH + Co., Ennepetal, Fed. Rep. of Germany

[21] Appl. No.: 828,802

[22] PCT Filed: Apr. 4, 1991

[86] PCT No.: PCT/DE91/00297
§ 371 Date: Mar. 2, 1992
§ 102(e) Date: Mar. 2, 1992

[87] PCT Pub. No.: WO91/19338
PCT Pub. Date: Dec. 12, 1991

[30] Foreign Application Priority Data
May 30, 1990 [DE] Fed. Rep. of Germany ....... 4017330

[51] Int. Cl.⁵ .............................................. H02G 3/04
[52] U.S. Cl. ...................................... 174/101; 174/68.3
[58] Field of Search ................... 174/101, 95, 96, 97, 174/98, 48, 49, 66, 68.3, 68.1

[56] References Cited

U.S. PATENT DOCUMENTS
3,126,444  3/1964  Taylor ................................ 174/101
3,329,763  7/1967  D'Esopo ........................... 174/70 R

FOREIGN PATENT DOCUMENTS
2516404  10/1976  Fed. Rep. of Germany .
7701076   5/1977   Fed. Rep. of Germany .
8704502   5/1987   Fed. Rep. of Germany .
8806713   7/1988   Fed. Rep. of Germany .
2622956   5/1989   France ............................ 174/101

Primary Examiner—Leo P. Picard
Assistant Examiner—Hyung S. Sough
Attorney, Agent, or Firm—Max Fogiel

[57] ABSTRACT

A duct consisting of a housing-like channel. Inside the channel are parallel electrical conductors that loads can be connected to by means of adapters. The duct is coated or surface-treated while assembled, with its cover in place, that is. The design prevents paint from entering the housing or the site of contact between the housing and the cover during the surface treatment.

8 Claims, 2 Drawing Sheets

ELECTRICAL-WIRING DUCT

BACKGROUND OF THE INVENTION

The invention concerns an electrical-wiring duct to ensure future power and communications, with electrical potential between its cover and housing compensated.

A wall-mounted duct with a metal base that accommodates electrical wiring is known from German GM 8 70 4502. It consists essentially of structural C section, open along one side. The opening is closed off by a cover that is also made of metal. Along the edges of the duct are grooves that the cover can snap into. The grooves also contain metal clips with prongs integrated into them that come into contact in the grooves and against the cover when the duct is closed up. The contact produces an electrical connection between the base and the cover. The prongs are in the form of loops and are intended to penetrate any enamel or lacquer on the base. The design facilitates mounting the cover on and removing it from the base without damaging either component. One drawback to such a duct is that the base and cover cannot be enameled or surface-coated while together. Another drawback is that the metal clips require an additional component, which means extra installation expense and does not ensure that they can be removed.

German GM 8 704 502 discloses a duct for accommodating electric wiring that is also especially appropriate for accommodating electrically conductive strips and adapters. This duct is essentially metal structural U section with each side bent in to create a support for the cover that closes it off. The cover is accordingly locked into electrical contact with the base and can be released from it. Another duct for accommodating electrical conductors is known from German GM 7 701 100. Both the U-sectional base and the cover are also metal, snap together to create an electrical connection, and can be separated. Snap-in ribs in the form of strips are provided for this purpose along the inner surface of the cover, project into the vicinity of the cover's edge, and are secured by engaging the bent-in areas. The connection and contact is further promoted by clips in the form of springs. Since the springs do not extend through the total length of the projection, however, it is impossible to prevent paint from penetrating when the duct is painted and damaging the contact.

German GM 8 806 713 discloses a duct of metal essentially U section with bent-in areas. The cover is secured to the base by two snap-in ribs extending out in the form of continuous strips from the inner surface of its edges and engaging the U section. The edges of the cover, however, rest against the bent-in areas.

German OS 2 516 404 discloses a duct with a U-sectional base and a cover, both of which may be metal. Like another embodiment that has been applied for, it has already-known covers with two longitudinal projections or snap-in ribs that rest against each other along the base, leaving a space that can protect the contact surface inside the housing from penetrating paint. The outer edge of the cover, however, rests against the sectional base.

German GM 7 701 076 describes a cable duct of several connecting sections. The cover is secured together by additional difference-compensating clips inside the longitudinal side of the groove. This type of connection is intended to eliminate play between the separate sections of duct and its cover. The clips, however, are made of such an elastic material as plastic or rubber. Another objective is to eliminate clicking.

German OS 3 516 149 discloses a cable-duct section for laying wires. All the components of this duct are interchangeable and can be connected by simple snap-together connectors.

All the aforesaid disclosure address cable duct or current-conductive strip protected by a closure (cover or wall). It is precisely this type of duct that is often made of plastic. When on the other hand they are made of metal, they are surface-coated to improve their appearance. The coating can be spray-painted or applied electrostatically. Such a coating, however, makes it impossible to ensure metallic contact between the duct's housing and cover. This situation does not comply with existing standards with respect to malfunction.

SUMMARY OF THE INVENTION

The object of the present invention is a duct of the aforesaid type wherein the electric potential between the housing and the cover will be reliably compensated. It will also be possible to remove the cover from the housing without additional tools. The potential must remain compensated even when the cover is removed and replaced several times. Another objective is that it will be possible to remove the cover without damaging the coating once the assembled duct, the housing with the cover in place, that is, has been surface-coated.

This object is attained in accordance with the invention by elevations at the edges of the cover and/or of the housing that prevent the edges from resting directly against the housing even though the coating includes the corners of the cover. Removing the cover subsequent to surface coating will accordingly not damage the coating. It will, however, simultaneously be impossible for any of the coating to penetrate into an artificially created space between the cover and the housing. The cover will snap on in the known way and will be in constant contact with the housing. Since the cover and housing are attached before the surface is coated, no paint or coating will be able to penetrate between the two components either at the point of contact or within the space that augments the protection. The design ensures an equal compensation of the potential between the housing and the cover without detriment to the duct's appearance.

It is in relation to electrostatic surface treatment in particular that the duct in accordance with the invention is extremely important because the definite gap between the housing and the cover more or less creates a Faraday cage, preventing the coating from penetrating into this vicinity and permanently depositing. The artificially created space behind the projection will accordingly remain free of all coating.

Nor will any material enter the vicinity in the event of ordinary enameling, and the inner edges will also remain free of enamel.

A comprehensive potential compensation is becoming more and more of a requisite nowadays. This is true not only of medical-treatment areas but of other interior spaces as well. The duct in accordance with the invention ensures reliable potential compensation between housing and cover, which makes it practical for hazardous conditions like medical-treatment areas for example. The approach, however, is in no way detrimental to the duct's appearance. The cover can also be easily removed without tools.

BRIEF DESCRIPTION OF THE DRAWINGS

The invention will now be specified with reference to schematically illustrated embodiments.

DESCRIPTION OF THE PREFERRED EMBODIMENTS

Figure 1:
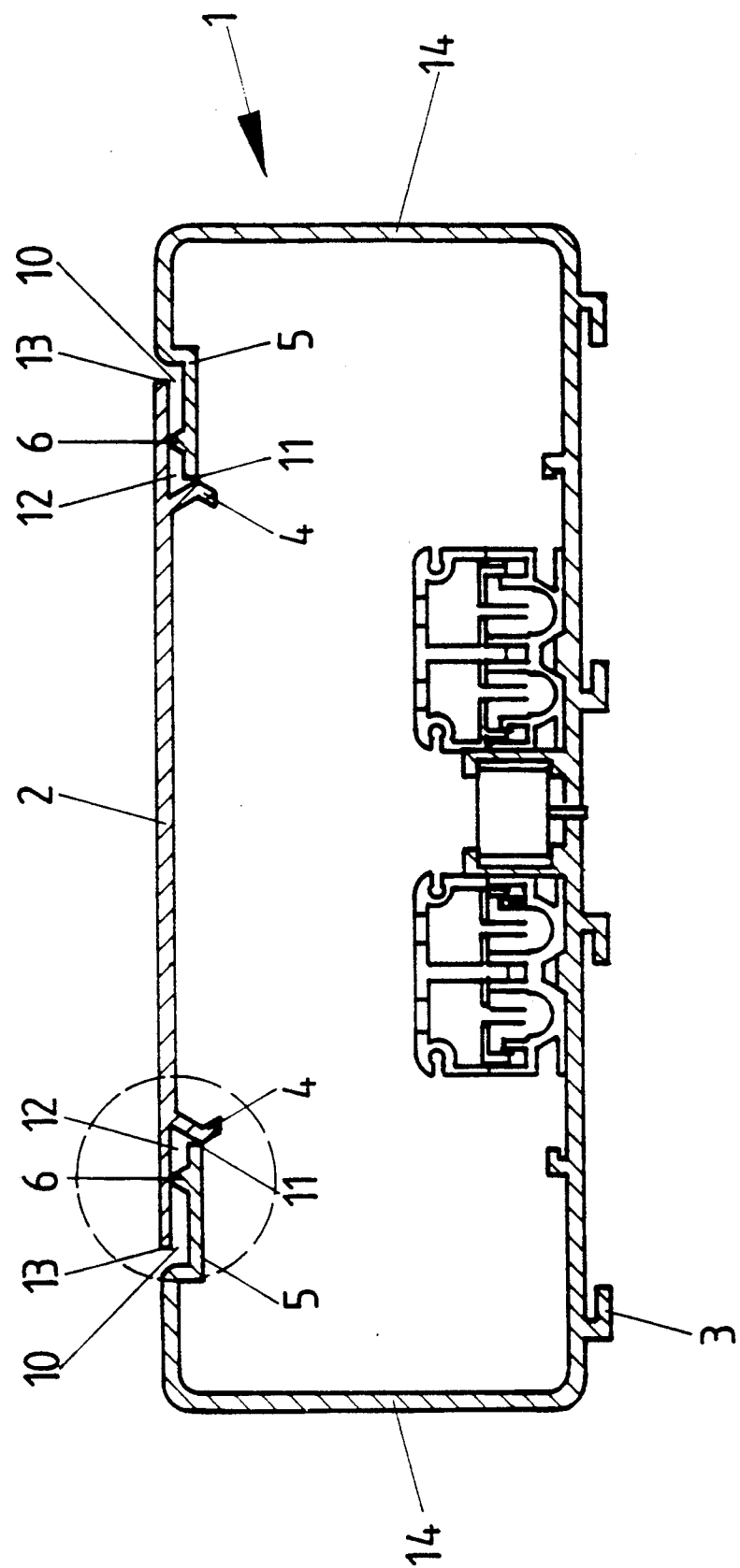
FIG. 1 is a section through a duct.

The duct's housing 1 is mainly rectangular in section. Inside the housing is an unillustrated strip contact that accepts and adapter The duct is mounted at its base 3 and has a cover 2. As will be evident from FIG. 1, cover 2 rests slightly inside housing 1. The housing has opposing and parallel sides 14 perpendicular to base 3. Along their two free edges the sides have bent-in areas 5 that constitute a support for cover 2.

Cover 2 is secured to housing 1 by snap-in ribs 4 on its inner surface and can be removed from the housing. The connection can be established by a light pressure on the outer surface of cover 2. The point of contact between cover 2 and housing 1 constitutes a contact surface 11. Snap-in ribs 4 are shaped to ensure a reliable connection between cover 2 and housing 1 even when the cover has been removed and replaced several times. This feature is augmented in that sides 14 slope slightly in toward the inside of the duct, generating a certain resilience that helps to secure the cover. There is a projection 6 on either cover 2 or housing 1 in the vicinity of bent-in areas 5. The projection is high enough to prevent the edge 13 of cover 2 from resting directly against housing 1 when in place. Projection 6 also creates an empty space 10 between cover 2 and housing 1. The space is dimensioned to prevent contact between cover 2 and housing 1 during surface treatment. This measure prevents damage to edge 13 from adhering paint or coating when cover 2 is removed. When the surface is electrostatically treated, a Faraday cage will occur in the vicinity and prevent any particles or coating from entering.

Projection 6, which can be single or multiple, simultaneously creates an additional space 12 that prevents paint from arriving at the contact surface 11 between housing 1 and cover 2 by way of ribs 4. The result is potential compensation by way of contact surface 11 at each long side of the closure between housing 1 and cover 2. No paint or protective coating can reach any part of the interior of the duct's housing, including the area of cover 2 between ribs 4. A duct of this kind with its cover in place can be surface-coated with no risk of any paint arriving at contact surface 11. There will be no need to clean the surface later.

The precise shape of projection or elevation 6 is of subordinate importance. It can be a tapering edge as illustrated in FIG. 1 or any other shape directly positively integrated into the housing or cover while it is being manufactured.

Figure 2:
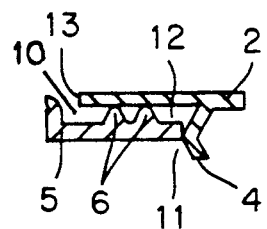
FIG. 2 is a detail with two elevations.
Figure 3:
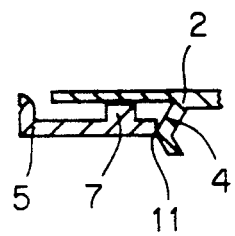
FIG. 3 is a detail with a rectangular elevation.
Figure 4:
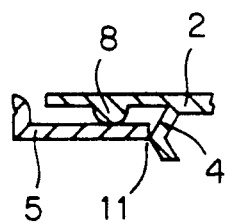
FIG. 4 is a detail with a semicircular elevation.
Figure 5:
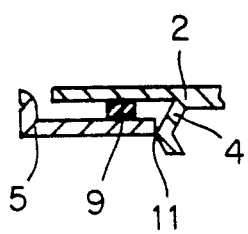
FIG. 5 is a detail with cemented-on strips.

FIG. 2 illustrates an embodiment with two tapering projections 6. FIG. 3 illustrates a rectangular or square projection 7. The projection can also be a hemisphere or semicircle as illustrated in FIG. 4.

The same effect can also be attained by applying or cementing on a material of specific strength. Such a material can be foam or another elastic. This approach to creating a space 12 between cover 2 and housing 1, however, is not especially practical because of the additional manufacturing expense. Frequent removal of the cover can also damage a projection applied with adhesive, eliminating the potential compensation between housing and cover.

If, in contrast to the invention, the housing and cover are separately enameled, a potential compensation can be attained in the later assembled components by additional cementing the appropriate areas, ribs 4 and contact surface 11 for example. Further efforts will of course then be necessary to remove the residual cement. Such an approach would not guarantee a potential compensation between the housing and cover. For these reasons, accordingly, the only way to absolutely ensure such compensation is by means of the present invention. The potential compensation between the housing and cover will remain completely in force even after the cover has been removed and replaced many times. Since the projects are integrated into the cover or housing while it is being manufactured, the object of the present invention represents a cost-effective and reliable solution to the problem of creating a potential compensation between the two components. Accordingly, any extraneous currents and voltages deriving from defects or short circuits in the housing or cover will be grounded and will constitute no hazard for the duct's users.

I claim:

1. An electrical wiring duct, comprising: an electrically grounded metallic channel housing of U-shaped structural metal section; a cover for closing said channel housing without additional tools and by contacting sealingly said channel housing at at least two locations; said cover having edges engaging said channel housing and having two ribs formed by continuous strips along an inner surface of said edges engaging said channel housing; said channel housing having a bent-in area forming a support for said cover; at least one projection extending along said channel housing between said edges and said bent-in area; said cover and said projection forming a first contact surface; said bent-in area having a second contact surface abutting a pointed surface of said ribs and generating a scraping action between said second contact surface and said ribs during mounting said cover in place and removing said cover for securing electrical conductivity between said cover and said channel housing and thereby equalizing the electrical potential between said cover and said grounded channel housing; said pointed surface of said ribs and said second contact surface being dimensioned so that when said cover is snapped into said channel housing said edges of said cover are spaced from said channel housing and out of contact with said channel housing, said projection being located between said ribs and said edges to form a hollow space preventing entry of coating material.

2. An electrical wiring duct as defined in claim 1, wherein said projection has a triangular shape.

3. An electrical wiring duct as defined in claim 1, wherein said projection has a rectangular shape.

4. An electrical wiring duct as defined in claim 1, wherein said projection is square-shaped.

5. An electrical wiring duct as defined in claim 1, wherein said projection has a semi-circular shape.

6. An electrical wiring duct as defined in claim 1 wherein said cover and said channel housing has at least one said projection.

7. An electrical wiring duct as defined in claim 5, wherein said projection is on said cover.

8. An electrical wiring duct, comprising: an electrically grounded metallic channel housing of U-shaped structural metal section; a cover for closing said channel housing without additional tools and by contacting sealingly said channel housing at at least two locations; said cover having edges engaging said channel housing and having two ribs formed by continuous strips along an inner surface of said edges engaging said channel housing; said channel housing having a bent-in area forming a support for said cover; at least one projection extending along said channel housing between said edges and said bent-in area; said cover and said projection forming a first contact surface; said bent-in area having a second contact surface abutting a pointed surface of said ribs and generating a scraping action between said second contact surface and said ribs during mounting said cover in place and removing said cover for securing electrical conductivity between said cover and said channel housing and thereby equalizing the electrical potential between said cover and said grounded channel housing; said pointed surface of said ribs and said second contact surface being dimensioned so that when said cover is snapped into said channel housing said edges of said cover are spaced from said channel housing and out of contact with said channel housing, said projection being located between said ribs and said edges to form a hollow space preventing entry of coating material; said edges of said cover extending over said bent-in area with a gap between said edges and said bent-in area, said projection being within said gap and forming a seal at said first contact surface between said edges and said bent-in area.

* * * * *